Patented May 30, 1933

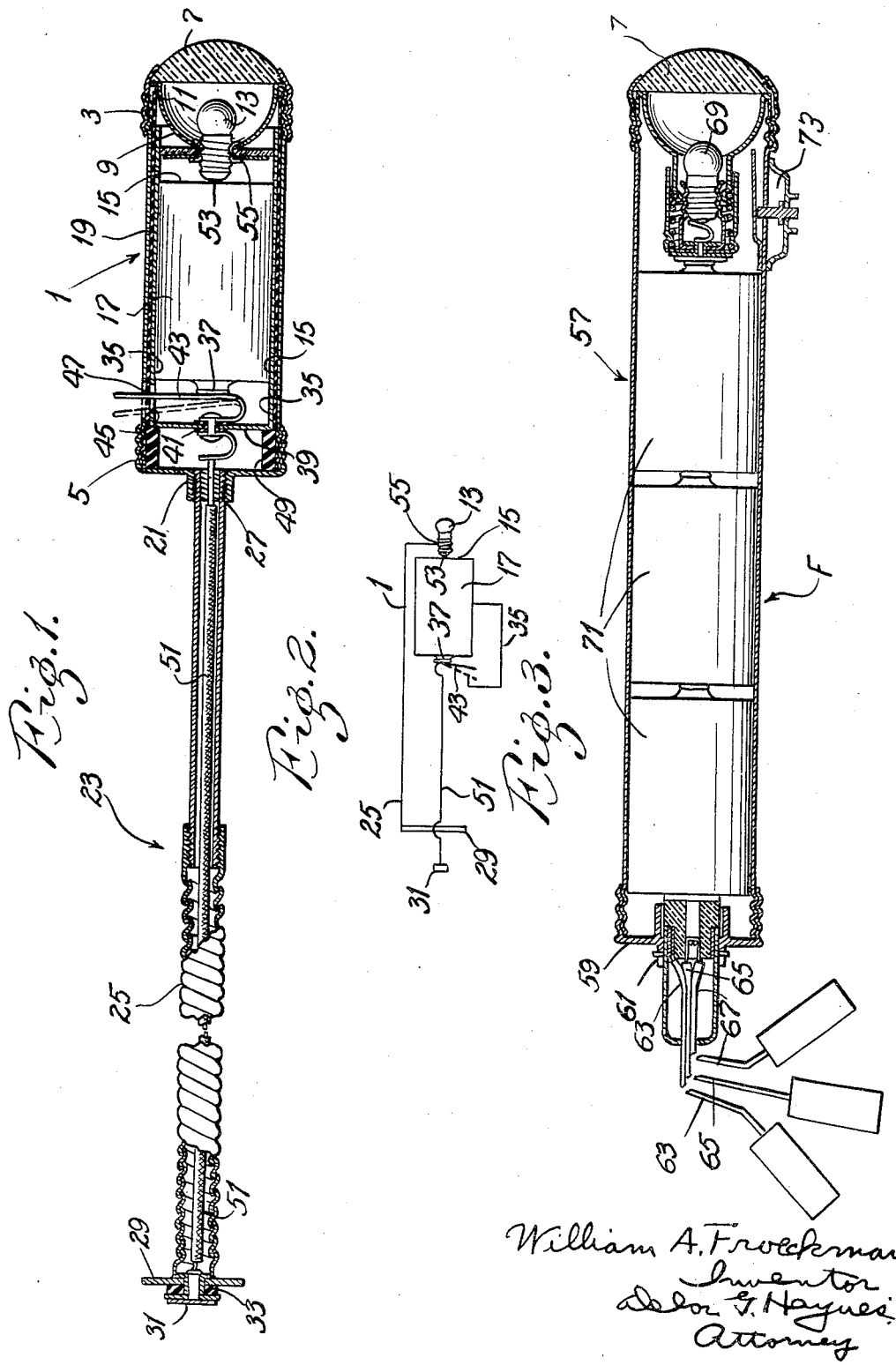

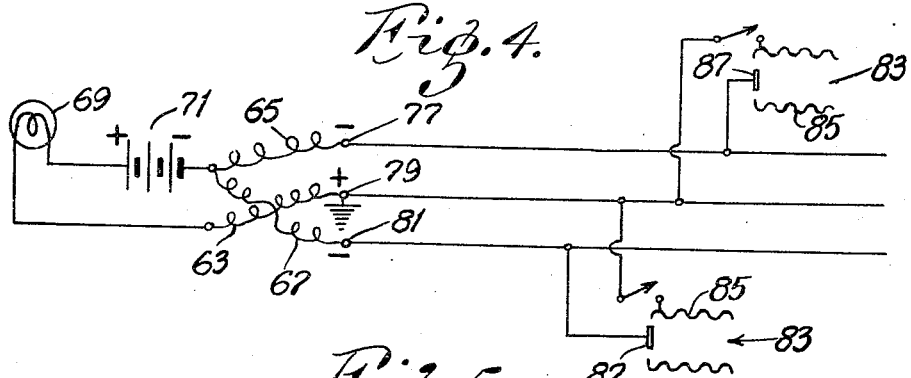
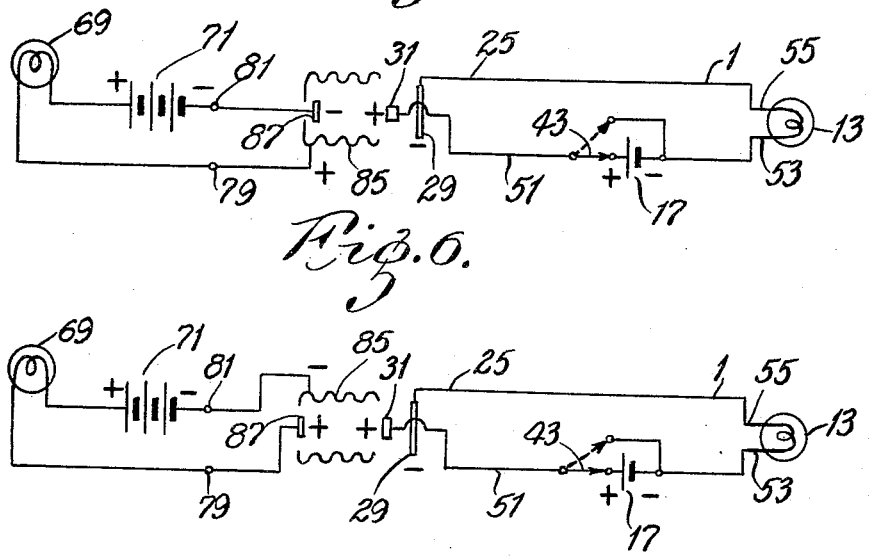
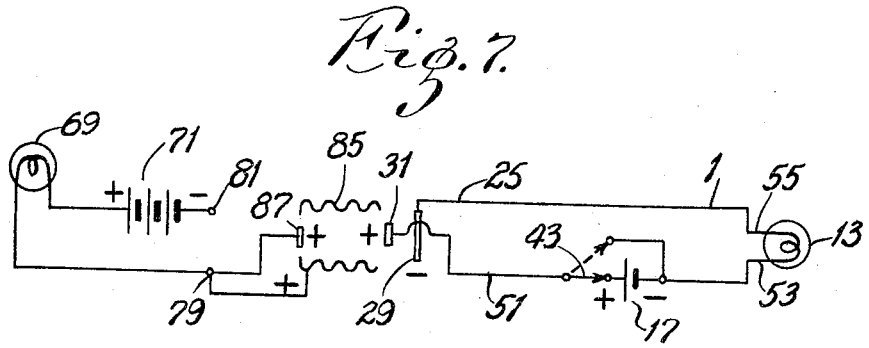

1,912,185

UNITED STATES PATENT OFFICE

WILLIAM A. FROECKMAN, OF ST. LOUIS, MISSOURI

ELECTRICAL TESTING APPARATUS

Application filed December 12, 1930. Serial No. 501,329.

This invention relates to electrical testing apparatus, and with regard to certain more specific features, to a device for testing electrical circuits, especially wiring circuits of buildings and the like.

Among the several objects of the invention may be noted the provision of an electrical testing device which is adapted to be used in testing electrical sockets or the like in a building wiring circuit or the like; the provision of a device of the class described which may be used in making various tests for determining the nature of an error which has been made in a wiring circuit; the provision of a testing device of the class described which uses a given number of electrical cells and lamps in various circuit combinations to effect a variety of tests; the provision of a device of the class described which may conveniently be made in the form of a flashlight of simple and rugged form and which has no continuously moving parts; and the provision of an electrical testing device of this class which may be economically fabricated. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a longitudinal section of a portion of my testing device which portion is conveniently made to include only one flashlight cell;

Fig. 2 is a schematic circuit diagram of the parts of Fig. 1;

Fig. 3 is a side elevation of a flashlight and connections comprising a current supply;

Fig. 4 is a wiring diagram illustrating uses of the invention, inclusive of a test for a short-circuit;

Fig. 5 is a wiring diagram showing a test on a circuit having correctly connected sockets;

Fig. 6 is a wiring diagram showing a test on a circuit having incorrectly connected sockets; and, Fig. 7 is a wiring diagram showing a test on a circuit having a socket with both terminals of said socket connected to the same lead.

Similar reference characters indicate corresponding parts throughout the several views of the drawings.

Referring now more particularly to Fig. 1, there is illustrated at numeral 1 a flashlight casing provided with caps 3 and 5. Screw cap 3 holds in assembled relation the lens 7 and the socket reflector 9, an abutment 11 being provided against which the reflector 9 may rest. A bulb 13 is screwed into the socket reflector 9 and the central contact of the bulb makes contact with the zinc casing 15 of the dry battery cell or electromotive means 17. An insulating sleeve 19 surrounds the cell 17 and insulates the cell from the casing 1.

The cap 5 is provided with a socket 21 at its central portion for receiving a terminal extension 23. This terminal extension 23 preferably should be all or in part flexible so that the device may conveniently be used in testing sockets and like apparatus which are not fully exposed, such as shaded lighting fixtures. The casing of the extension may conveniently comprise a flexible conduit 25 which is adapted to be screwed at one end 27 into the socket 21 and which is provided at the other end with a terminal disk portion 29 which is small enough to fit within an electric light socket.

Mounted on the terminal 29 is a second terminal 31 adapted to contact with the inner or central terminal of an electric light socket. This terminal 31 is insulated from the terminal 29 by means of an insulating bushing 33.

A cylindrical portion 35 partially fits over dry cell 17 so as to make electrical contact with the zinc casing 15 and provide a space between the end of the protruding carbon element 37 and the closed end 39 of said portion 35. Mounted on the end 39 and insulated therefrom by the bushing 41, is a spring switching member 43 adapted to make contact with the protruding carbon element 37.

This spring member 43 protrudes slightly from the casing 1 so that it may be moved to break its contact with the carbon element 37 and make contact with the portion 35 at point 45, as illustrated by the dotted lines in Fig. 1. It will be noted that the insulating member 19 is provided with an opening 47 of such a size that in either position, the spring member 43 does not contact with the casing 1; and that in its normal position (contacting with the carbon element 37) the spring member does not contact with the member 35.

The portion 35 is insulated from the screw cap 5 by means of a sleeve 49 which also is adapted to aid in properly spacing the component parts of the assembly. This sleeve 49 may conveniently comprise a part of the sleeve 19.

The center terminal 31 is connected to the switch member 43 by means of a wire 51 which is insulated from the conduit 25 and the screw cap 5.

The circuit through the device is as follows, starting with the central terminal 31 and considering that the switch 43 is in contact with the carbon element 37, the central contact 31 being positive because the wire 51 connects the contacting switch member 47 with the terminal 31: the negative zinc casing 15 of the cell 17, contacts with the central contact 53 of the bulb 13. The outer contact 55 of the bulb 13 is in contact with the reflector 9 which is in contact with the outer terminal disk 29 by means of the casing 1, cap 5, and the conduit 25. The terminal 29 is therefore negative.

This circuit is shown schematically in Fig. 2. It is clear that there is provided when the switch is in its normal position (full lines) a series connection of the cell 17 and the bulb 13 with the contact terminals 29 and 31, said terminals 29 and 31 being at the polarities indicated. It is also clear that if the switch 43 be moved so that it contacts with the zinc part 35 at the point 45 (see also Fig. 1), the bulb 13 only is in series with the terminals 29 and 31 and that neither of these terminals assumes a polarity from the cell 17 (Fig. 2).

In the preferred method of using this testing device, I connect one or more (preferably several) cells to the wiring system to be tested, so as to provide a direct current voltage at each of the sockets or the like to be tested. Assuming that a three-wire-grounded-neutral wiring system is to be tested, the device F shown in Fig. 3 may be used as shown in Fig. 4 to conveniently supply the direct current voltage for testing. The device F comprises a flashlight 57 provided at its rear screw cap 59 with a bayonet plug and socket arrangement 61 connecting 3 lead wires 63, 65 and 67 in circuit with a three cell battery 71, a bulb 69, and switch 73. The bulb 69 provides means for positively determining whether or not current and voltage is being supplied to the system. Wires 65 and 67 are both connected to the negative element of the battery and wire 63 is connected to the positive element.

Test for short

The lead wires 63, 65 and 67 are connected to the meter terminals 77, 79 and 81 as shown in Fig. 4. If there be any short circuits of the lines 77, 79 and 81 the bulb 69 should light when these leads are connected.

Assuming that the battery 71 is a 4½ volt battery and that it is connected as shown in Fig. 4, the testing device shown in Figs. 1 and 2 is used as follows:

Socket test (correctly connected; Figs. 4 and 5)

In Fig. 4, the sockets 83 are shown connected to the wiring system in the proper manner, that is, their shells 85 are connected to ground.

Fig. 5 shows schematically the wiring diagram when the testing device of Figs. 1 and 2 is inserted in a socket which is properly connected. It is clear that such a connection places the 4½ volt battery 71 and the cell 17 in series aiding so that the bulb 13 burns with full brilliance induced by the combined voltages of the cells 17 and 71. Hence both of the bulbs 13 and 69 are in series with a 6 volt source, the voltage of cell 17 being 1½. The full brilliance of the bulb 13 is the signal that the socket is correctly wired.

Sockets incorrectly connected with reverse polarity (Fig. 6)

If a socket be connected so that the inner terminal 87 is grounded instead of the shell 85, the connections for a test are shown in Fig. 6. When the testing device is inserted in the socket, the bulb 13 will light to only a dull red. This condition obtains because the 4½ volt battery 71 is in series opposition with the 1½ volt battery 17 and the two bulbs 69 and 13 are in series with these bucking voltages, the net voltage applied to the two bulbs being three volts.

Both terminals of socket connected to same lead (Fig. 7)

If a socket be improperly connected so that both of its terminals are connected to the same side of the line, the test connections are as shown in Fig. 7. Such a mistake is frequently called in the trade a "two-timer". It will be noted that the socket is short circuited and that no voltage from the battery 71 is applied. Therefore, when the testing device is inserted into the socket the bulb 13 will burn with a medium brilliance. The bulb 13 burns with the voltage of the cell 17 (1½ volts) applied thereto. To clearly establish this test and distinguish between the low brilliance (Fig. 7) and a full brilliance (Fig. 5) or the brilliance of Fig. 6 the switch arm 43 is pressed so that it is shifted to the dotted line position shown. If the socket is a "two-timer" (Fig. 7) the bulb 13 will not light when the switch is held in the dotted-line position for it is clear (Fig. 7) that the cell 17 is removed from the circuit and by-passed, the circuit being reclosed. In Figs. 5 and 6, however, it will be noted that when the switch 43 is shifted to the dotted line position, that both the bulbs 13 and 69 are in series with the battery 71 and a light therefore obtains for the bulb 13 which is below the respective brilliances for the connections referred to when the switch 43 is not shifted.

The lens 7 is frosted in order to aid in distinguishing the different degrees of brilliance of the bulb 13.

The above tests are given as exemplary and others will suggest themselves. It will be seen that in effect the lamps 13 and 69 comprise resistances which cooperate with the respective batteries to provide variations in brilliance under different arrangements, depending upon the type of defect, and at the same time, their lighting effect is the signal whereby the defects are identified.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a tester for circuits having possibly defectively arranged terminals, means for applying a voltage to such a circuit, another means for applying a voltage to said circuit from said defective terminals, said last-named means comprising a battery and a signal adapted to be placed in a series across said terminals and means for by-passing said battery.

2. In a tester for circuits having possibly defectively arranged terminals, means for applying a voltage to a circuit, another means for applying another voltage to said circuit from said defective terminals, said last-named means comprising a battery and a signal adapted to be placed in a series across said terminals and means for by-passing said battery, whereby at least three variations of resistance and voltage may be effected so as to provide at least three variations in intensity of said signal under different circuit conditions.

3. In a tester for circuits having possibly defectively arranged terminals, means for applying a voltage to such a circuit, another means for applying another voltage to said circuit from said defective terminals, said last-named means comprising a battery and a signal adapted to be placed in a series across said terminal, means for by-passing said battery, whereby at least three variations may be effected so as to provide at least three variations of intensity of said signal under different circuit conditions and a signal adapted to be energized by said first-named source of voltage, whereby the existence of a circuit for said first-named voltage may be determined.

4. In apparatus of the class described, circuit energizing means comprising a battery and a signal in series, means for attaching said circuit energizing means to a circuit, a second energizing means comprising a battery and signaling means in series therewith, said last-named battery operating with the circuit to be tested in bucking or aiding arrangement according to the conditions of said circuit, and means for by-passing said last-named battery without permanently breaking the circuit.

5. In apparatus of the class described, circuit energizing means comprising a battery and signal in series, means for attaching said circuit energizing means to a circuit, a second energizing means comprising a battery and signal in series therewith, said second-named battery operating with the circuit to be tested in bucking or aiding arrangement and means for throwing the second-named battery out of circuit, said second-named battery being of a different voltage than said first-named battery.

6. In apparatus of the class described, circuit energizing means comprising a battery and signal in series, means for attaching said circuit energizing means to a circuit, a second energizing means comprising a battery and signal means in series therewith, said second-named battery operating with the circuit to be tested in bucking or aiding arrangement, means for throwing the second-named battery out of circuit without permanently breaking the circuit, said second-named battery being of a different voltage from said first-named battery, and said signals having different normal operating voltages.

In testimony whereof, I have signed my name to this specification this 6th day of December, 1930.

WILLIAM A. FROECKMAN.